United States Patent [19]

Shimada et al.

[11] Patent Number: 5,506,598
[45] Date of Patent: Apr. 9, 1996

[54] ACTIVE MATRIX SUBSTRATE AND A METHOD FOR DRIVING THE SAME

[75] Inventors: Takayuki Shimada, Ikoma; Toshihiro Yamashita; Yutaka Takafuji, both of Nara, all of Japan

[73] Assignee: Sharp Kabushiki Kaisha, Japan

[21] Appl. No.: 5,361

[22] Filed: Jan. 19, 1993

[30] Foreign Application Priority Data

Jan. 21, 1992 [JP] Japan ................. 4-008745

[51] Int. Cl.$^6$ ................. G09G 3/36
[52] U.S. Cl. ................. 345/92; 345/94
[58] Field of Search ................. 340/784; 359/87, 359/88, 56, 57, 58, 59; 345/92, 87, 95, 94

[56] References Cited

U.S. PATENT DOCUMENTS

| | | | |
|---|---|---|---|
| 4,870,396 | 9/1989 | Shields | 340/740 |
| 5,012,228 | 4/1991 | Masuda et al. | 345/95 |
| 5,105,187 | 4/1992 | Plus et al. | 340/811 |

FOREIGN PATENT DOCUMENTS

| | | | |
|---|---|---|---|
| 59-81621 | 5/1984 | Japan . | |
| 1107237 | 4/1989 | Japan . | |
| 2-154467 | 4/1990 | Japan . | |
| 2141725 | 5/1990 | Japan | 345/92 |
| 8902144 | 3/1989 | WIPO . | |

OTHER PUBLICATIONS

International Symposium of the SID 1983, Digest of Technical Papers 10 May 1983, U.S., pp. 156–157.

*Primary Examiner*—Ulysses Weldon
*Assistant Examiner*—Amare Mengistu
*Attorney, Agent, or Firm*—Nixon & Vanderhye

[57] ABSTRACT

An active matrix substrate including a plurality of pixels arranged in a matrix manner and a plurality of switching elements connected in series to each of the plurality of pixels, each of the plurality of switching elements having a gate electrode, a gate electrode of at least one of the plurality of switching elements being electrically isolated from those of the other remaining switching elements.

8 Claims, 6 Drawing Sheets

ACTIVE MATRIX SUBSTRATE AND A METHOD FOR DRIVING THE SAME

BACKGROUND OF THE INVENTION

1. Field of the Invention

The present invention relates to an active matrix substrate used in a liquid crystal display device or the like and a method for driving the same.

2. Description of the Related Art

Hereinafter, a conventional active matrix substrate will be described referring to FIGS. 3 and 4. FIG. 3 shows a plan view of a conventional active matrix substrate, end FIG. 4 shows an equivalent circuit thereof. Two thin film transistors (TFTs) 303a and 303b are used for a switching function, and are controlled so as to be turned to an ON-state or OFF-state by a gate signal supplied from a gate driving circuit 309 via a gate bus line 301. A source driving circuit 308 supplies a video signal to a source bus line 302. The two TFTs 303a and 303b are connected in series. Such a configuration has an advantage of reducing the OFF-current in the TFTs over a single TFT. The OFF-current means a leakage current occurring between the source electrode and the drain electrode of the TFT when the TFT is in the OFF-state. The source bus line 302 is connected To the source electrode of the TFT 303a through a contact hole 305. The drain electrode of the TFT 303b is connected to a pixel electrode 304 through a contact hole 306. The pixel electrode 304 is formed of a transparent conductive film such as an Indium Tin Oxide (ITO) film. When the electric potential of the gate bus line 301 becomes high so as to turn ON TFTs 303a and 303b, the video signal is written into a pixel 307. The capacitance of the pixel 307 is equivalent to a capacitance obtained by sandwiching a liquid crystal between the pixel electrode 304 and a counter electrode on a counter substrate. The written signal Is held when the TFTs 303a and 303b are in the OFF-state. The characteristics of the pixel 307 for holding the video signal can be improved by providing an additional capacitance in parallel with the pixel 307 on the active matrix substrata.

Thus, in the conventional active matrix substrate, a plurality of TFTs arranged in series are used for a switching function in order to reduce leakage current in the TFTs. However, according to such a configuration, gate electrodes of the TFTs are electrically connected to one another. As a result, the same electric potential is applied to the respective gate electrodes of the TFTs.

In an active matrix type liquid crystal display device, a video signal written into a pixel is held by keeping the OFF-state of TFTs while the other video signals are written into the other pixels, thereby realizing a good display quality. When the OFF-characteristics of the TFT are insufficient, the video signal may be attenuated, and thus good display quality cannot be obtained. Herein, the OFF-characteristics mean characteristics of the TFT when the TFT is in the OFF-state. One method for improving the characteristics of the pixel for holding the video signal includes the step of providing an additional capacitance in parallel with the pixel on the active matrix substrate so as to increase the capacitance for holding the video signal. However, this method has a disadvantage of reducing the numerical aperture of the liquid crystal display device when too large additional capacitance is provided, resulting in darkening the display. Conventionally, even when a plurality of TFTs arranged in series are used as a switching function in order to reduce leakage current in the TFTs, the OFF-characteristics of the TFTs cannot be improved sufficiently.

SUMMARY OF THE INVENTION

The active matrix substrate of this invention, includes a plurality of pixels arranged in a matrix manner and a plurality of switching elements connected in series to each of the plurality of pixels, each of the plurality of switching elements having a gate electrode, a gate electrode of at least one of the plurality of switching elements being electrically isolated from those of the other remaining switching elements.

According to another aspect of the invention, the method of driving the active matrix substrate mentioned above includes the step of applying electric potentials to the respective gate electrodes of the plurality of switching elements so that the plurality of switching elements are in The OFF-state, an electric potential applied to at least one of the gate electrodes being different from electric potentials applied to the other remaining gate electrodes.

Thus, the invention described herein makes possible the advantage of reducing the OFF-current. In addition, the electric potential difference between the source bus line and the pixel electrode when a plurality of TFTs are in the OFF-state can be divided end assigned to the respective TFTs effectively. As a result, the characteristics of the pixel for holding the video signal can be improved. Further, when the active matrix substrate of the present invention is used in a liquid crystal display device, an excellent display quality can be achieved.

This and other advantages of the present invention will become apparent to those skilled in the art upon reading and understanding the following detailed description with reference to the accompanying figures.

DESCRIPTION OF THE PREFERRED EMBODIMENTS

Figure 1:
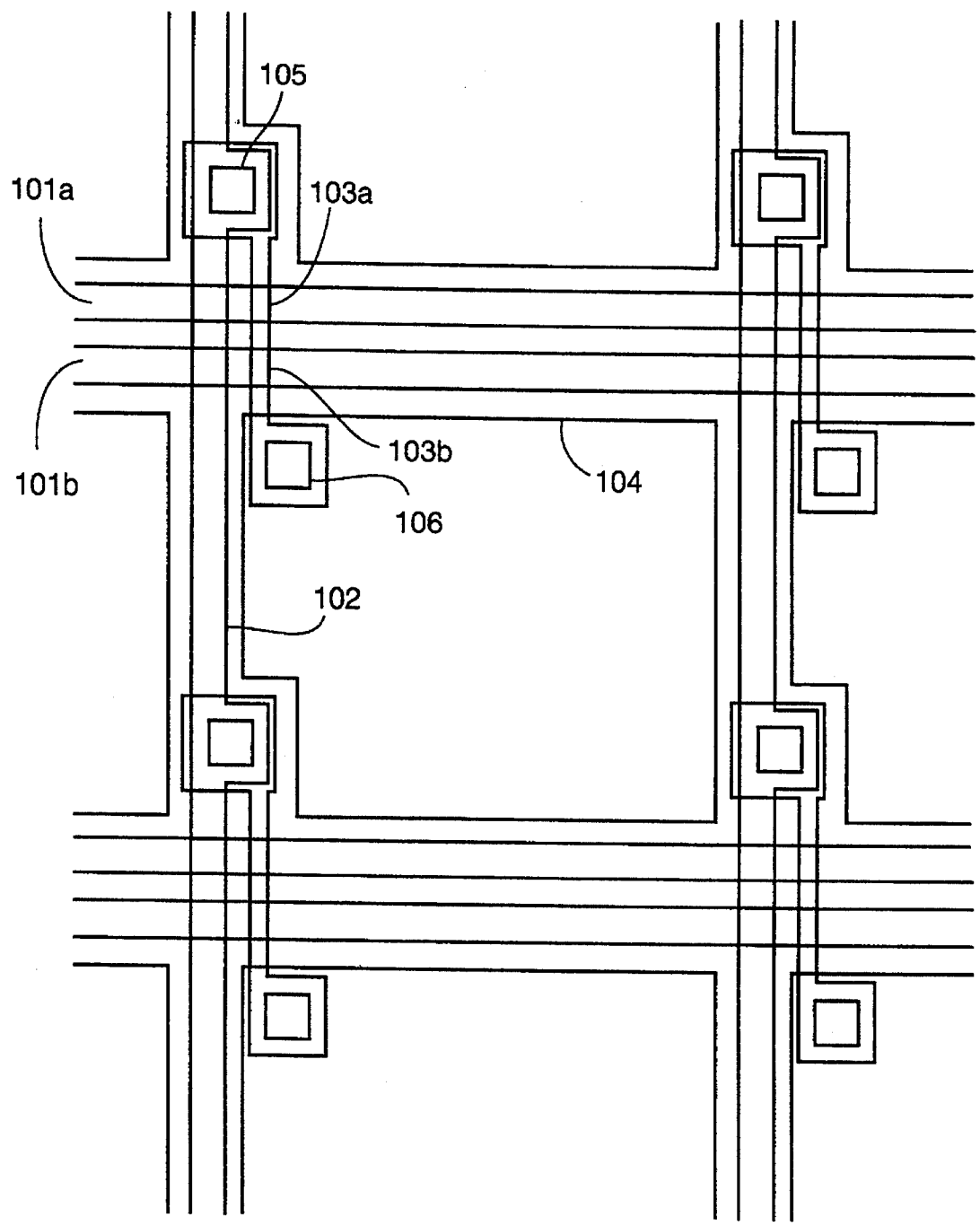
FIG. 1 is a plan view showing an exemplary active matrix substrate according to the present invention.
Figure 2:
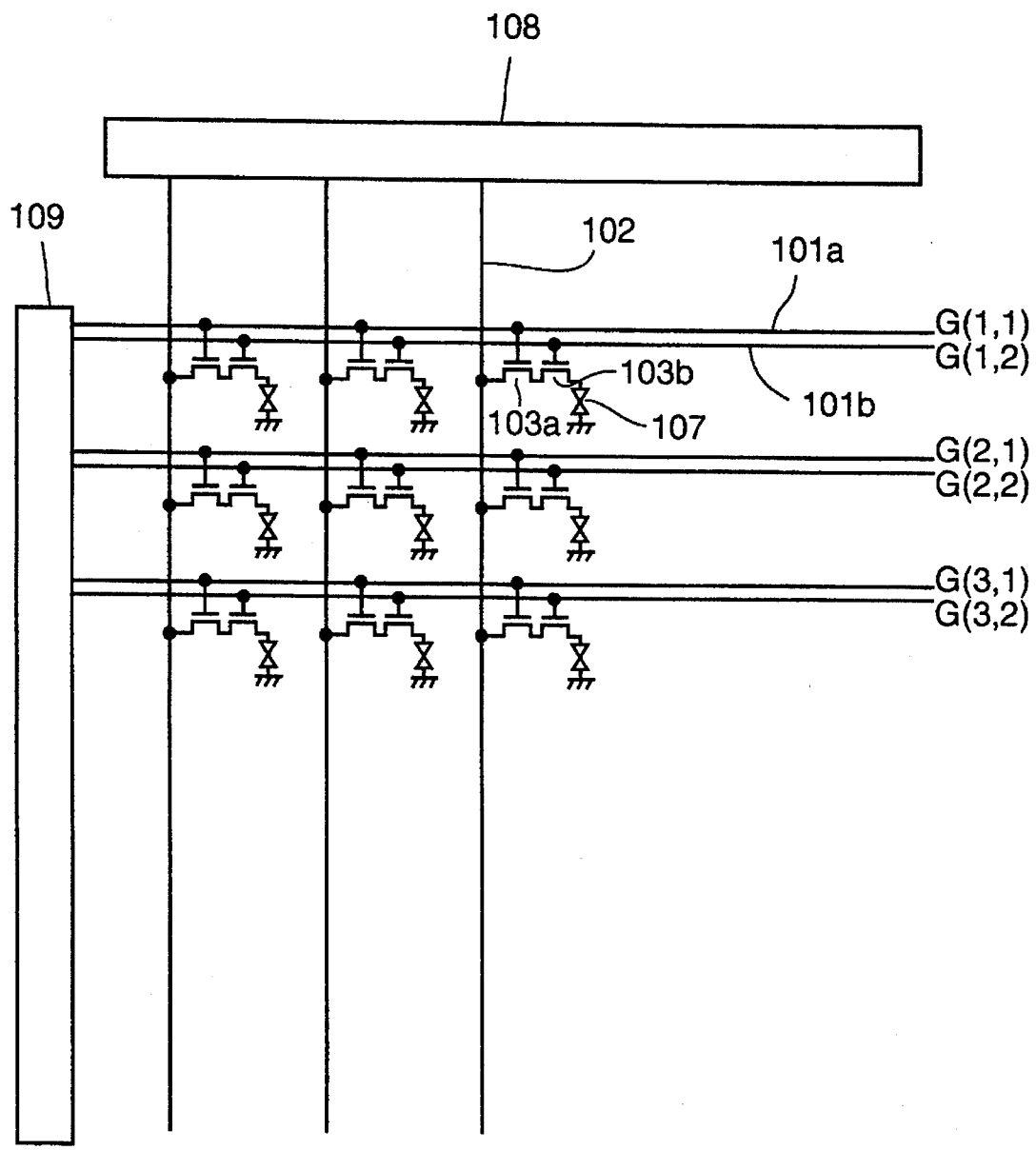
FIG. 2 is a circuit diagram of the active matrix substrate of FIG. 1.
Figure 3:
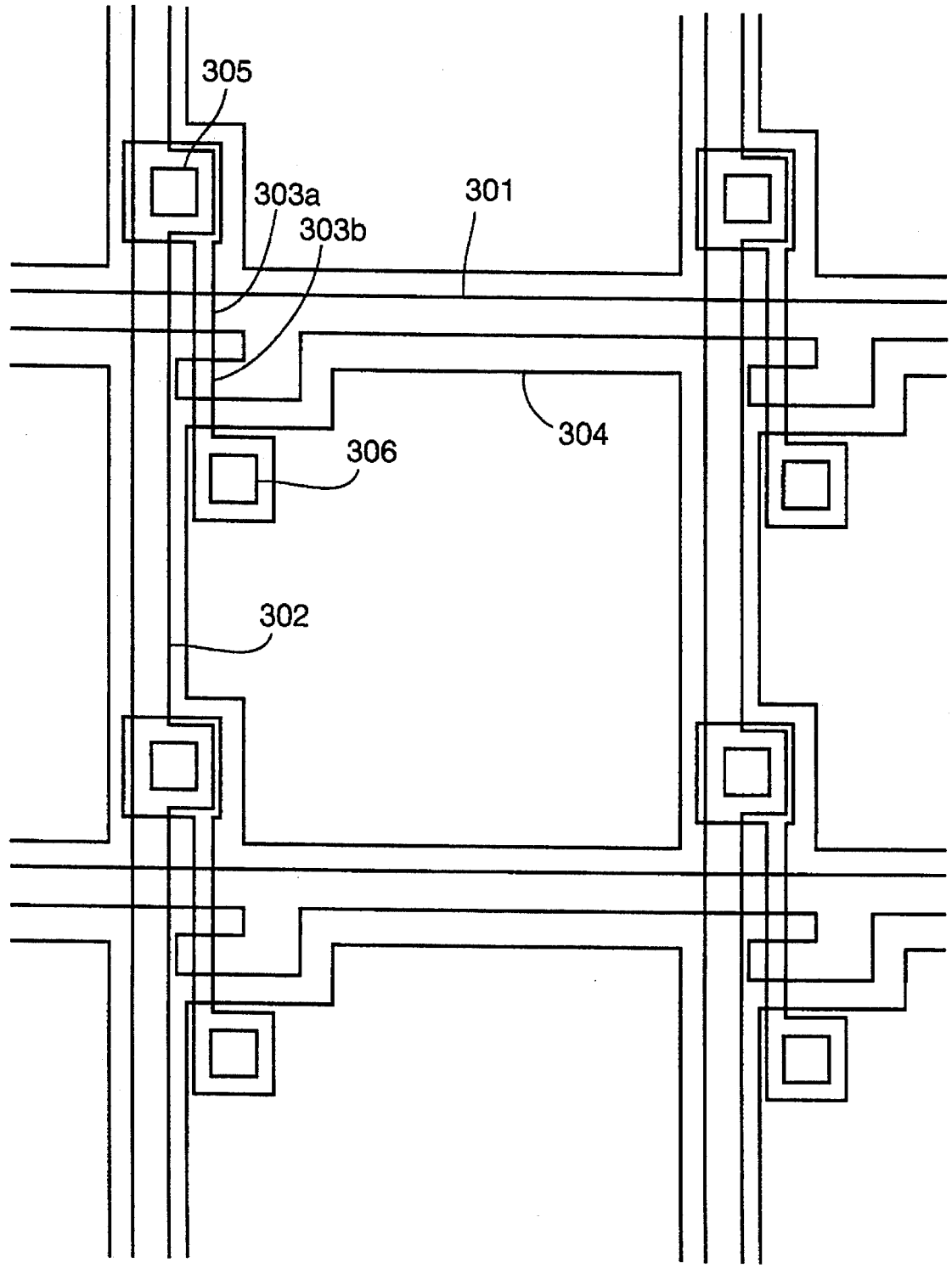
FIG. 3 is a plan view showing a conventional active matrix substrate.
Figure 4:
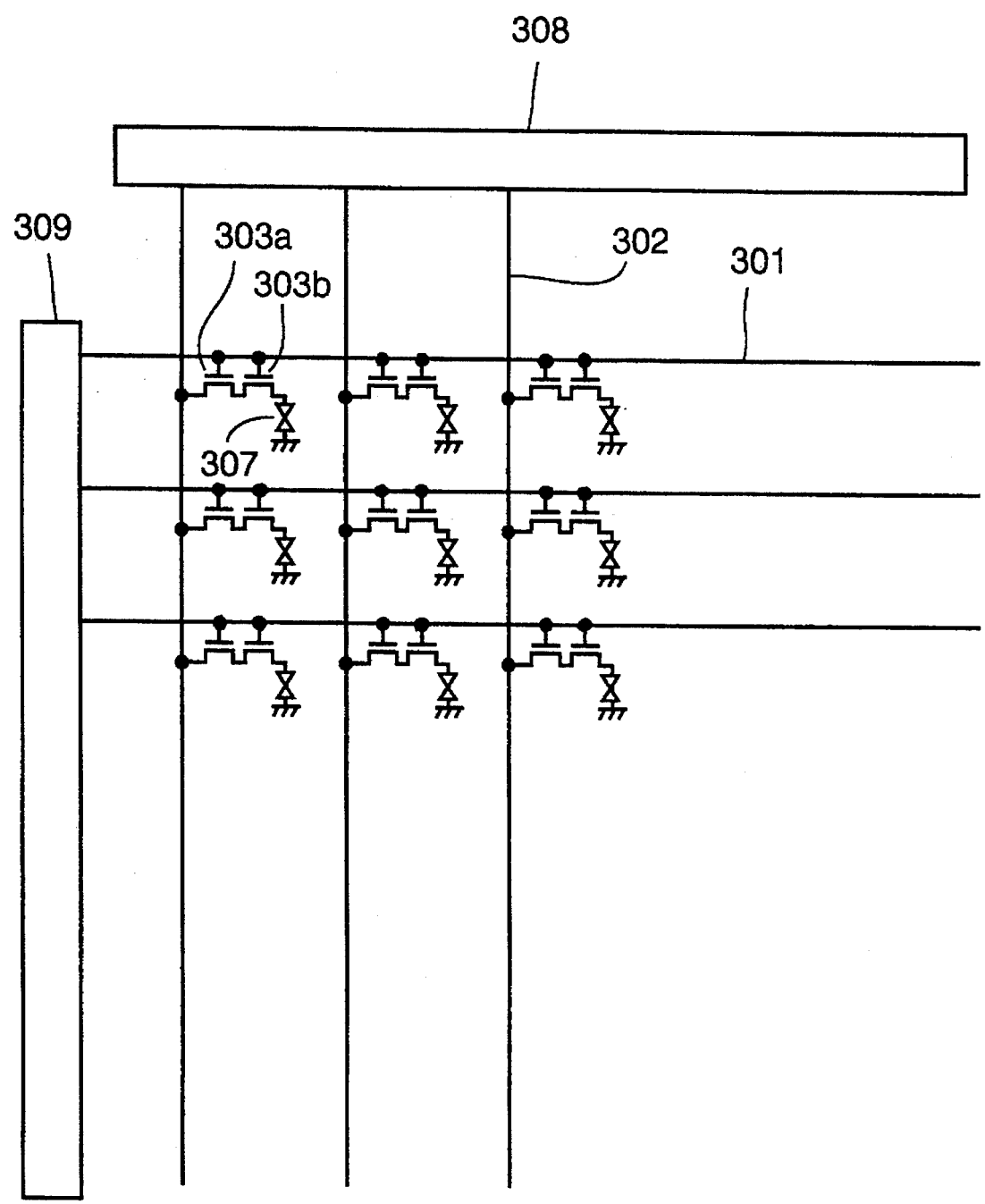
FIG. 4 is a circuit diagram of the conventional active matrix substrate of FIG. 3.

Hereinafter, the present invention will be described by way of illustrating an example referring to FIGS. 1 and 2. FIG. 1 shows a plan view of an active matrix substrate and FIG. 2 shows an equivalent circuit thereof.

Two gate bus lines, gate bus lines 101a and 101b, are arranged on the substrate for one scanning line. The gate bus lines 101a and 101b are electrically isolated from each other. Source bus lines 102 intersect the gate bus lines 101a and 101b. A part of gate bus line 101a functions as a gate electrode of TFT 103a and a part of gate bus line 101b functions as a gate electrode of TFT 103b. As a result, the gate electrode of TFT 103a end the gate electrode of TFT 103b are electrically isolated from each other.

A plurality of pixels 107 are arranged on the substrate in a matrix manner. The TFTs 103a and 103b are connected in series to one of the pixels 107. More specifically, the source bus line 103 is connected to the source electrode of the TFT 103a through a contact hole 105, the drain electrode of the TFT 103a is connected to the source electrode of the TFT 103b, and the drain electrode of the TFT 103b is connected to a pixel electrode 104 through a contact hole 106.

The pixel electrode 104 is formed of a transparent conductive film such as an ITO film. Channels of the TFTs 103a and 103b are formed of polysilicon. A gate insulating film is formed of a silicon oxide film deposited by a chemical vapor deposition (CVD) method, and the gate bus lines 101a and 101b are formed of n-type doped polysilicon. Impurity ions are implanted into the polysilicon by using the gate electrodes of TFTs 103a and 103b as implant masks. Then, the source electrodes and drain electrodes of the TFTs 103a and 103b are formed in the polysilicon in self-alignment with the gate electrodes after annealing for activating the implanted ions.

Figure 5:
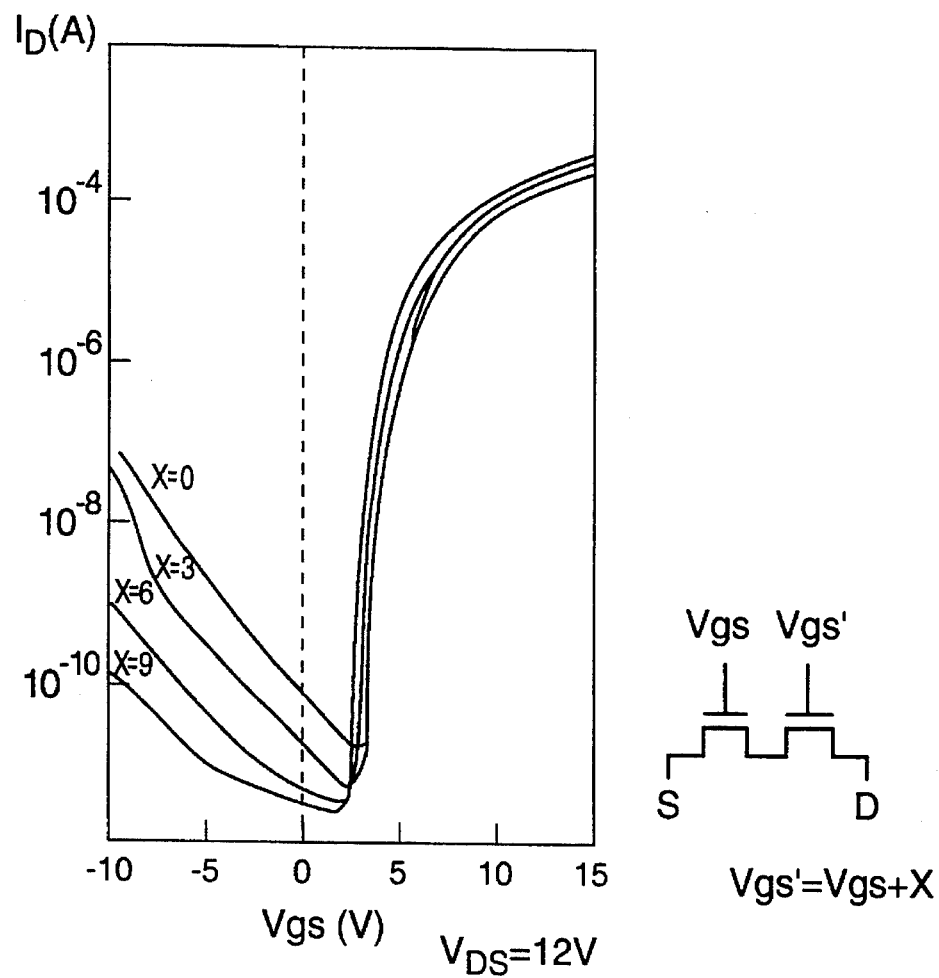
FIG. 5 shows the I–V characteristics when different electric potentials are applied to the gate electrodes of two TFTs connected in series.

FIG. 5 shows characteristics of the TFTs 103a and 103b connected in series described above. Each of the TFTs 103a and 103b has a channel with a width of 20 μm and a length of 4 μm. In FIG. 5, $V_{gs}$ on the X-axis denotes an electric potential difference between the source electrode and the gate electrode of the TFT 103a. $I_D$ on the Y-axis denotes leakage current occurring between the source electrode of the TFT 103a and the drain electrode of the TFT 103b. $V_{DS}$ denotes an electric potential difference between the source electrode of the TFT 103a and the drain electrode of the TFT 103b. In this Example, it is assumed that the electric potential difference $V_{DS}$ is 12 V.

Different electric potentials can be applied to the two gate electrodes of the TFTs 103a and 103b respectively, so that the TFTs 103a and 103b are in the OFF-state. Assuming that $V_{gs}$ denotes an electric potential applied to the gate electrode of the TFT 103a, $V_{gs}'$ denotes an electric potential applied to the gate electrode of the TFT 103b, and X denotes an electric potential difference between the electric potentials $V_{gs}$ and $V_{gs}'$, i.e. $V_{gs}'=V_{gs}+X$, the characteristics of the TFTs 103a and 103b connected in series where the electric potential difference X= 0, X=3, X=6 and X=9 are shown in FIG. 5. Note that when the electric potential difference X= 0, the characteristics of the TFTs 103a and 103b connected in series ere equivalent to those of the TFTs used in the conventional active matrix substrate. As seen from FIG. 5, it is understood that the OFF-characteristics of the TFTs of the present invention (where X=3, 6, 9) are improved compared with those of the TFTs used in the conventional active matrix substrate (where X=0).

The reasons for the improvement of the OFF-characteristics of the TFTS by applying different electric potentials to the respective gate electrodes of the TFTs are described below, referring to FIGS. 6a and 6b.

Figure 6A:
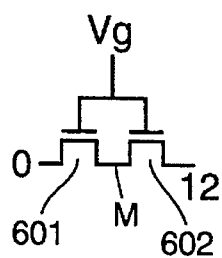
FIG. 6a shows a schematic view of TFTs for explaining a bias condition where the same gate potential is applied to the two TFTs.

FIG. 6a shows a schematic view of the TFTs 601 and 602 connected in series for explaining a bias condition in the case where the same electric potential $V_g$ is applied to the gate electrodes of the TFTs 601 and 602, as in the conventional substrate. In this example, it is assumed that the source-drain voltage $V_{ds}$ of the TFTs 601 and 602 is 12 V so that a video signal of ±6 V can be applied to a liquid crystal. Now assuming that an electric potantial at the point M is t V, the source-gate voltage $V_{gs}$ of the TFT 601 is equal to the applied voltage $V_g$ and the source-drain voltage $V_{ds}$ of the TFT 601 is equal to the voltage t at the point M, i.e. $V_{gs}=V_g$; $V_{ds}=t$, while the source-gate voltage $V_{gs}$ of the TFT 602 is equal to the voltage $V_g-t$ and the source-drain voltage $V_{ds}$ of the TFT 602 is equal to the voltage 12–t, i.e. $V_{gs}=V_g-t$; $V_{ds}=12-t$.

From the equations described above, if we assume t= 6 V, then the TFTs 601 and 602 have the same source-drain voltage $V_{ds}$. On the other hand, the source-gate voltage $V_{gs}$ of the TFT 602 is smaller than that of the TFT 601 by 6 V. A single TFT, as well as the two TFTs shown in FIG. 5, has the characteristics that the OFF-current is increased as the source-gate voltage $V_{gs}$ is decreased when the TFT is in the OFF-state. As a result, the resistance of the TFT 602 is lower than that of the TFT 601. Thus, the voltage t at the point M is actually required to be larger than 6 V (e.g., approximate 8.5 V). Accordingly, the OFF-current in the TFTs 601 and 602 is substantially equal to the OFF-current in a single TFT which satisfies the conditions of $V_{gs}=V_g$ and $V_{ds}=8.5$ V.

Figure 6B:
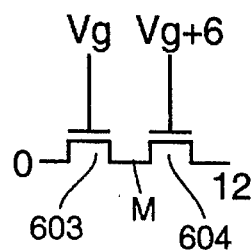
FIG. 6b shows a schematic view of TFTs for explaining a bias condition where different gate potentials are applied to the two TFTs.

FIG. 6b shows a schematic view of the TFTs 603 and 604 connected in series for explaining a bias condition in the case where different electric potentials, $V_g$ and $V_g+6$, are applied to the gate electrodes of the TFTs 603 and 604, respectively, according to the present invention. In this example, it is assumed that the source-drain voltage $V_{ds}$ of the TFTs 603 and 604 is 12 V, and the electric potential difference between the gate electrodes of TFTs 603 and 604 is half of the voltage $V_{ds}$, i.e. 6 V. If we assume t= 6 V, then each of the TFTs 603 and 604 satisfies the condition of $V_{gs}=V_g$ and $V_{ds}=6$ V. As a result, the resistance of TFT 603 and the resistance of TFT 604 are balanced. Accordingly, the OFF-current in the TFTs 603 and 604 is substantially equal to the OFF-current in a single TFT which satisfies the conditions of $V_{gs}=V_g$ and $V_{ds}=6$ V. According to the present invention, the applications of different electric potentials to the gate electrodes of TFTs 603 and 604 connected in series make it possible to control the bias condition for balancing the resistances of the TFTs 603 and 604, resulting in reducing the OFF-current in the TFTs 603 and 604.

Figure 7:
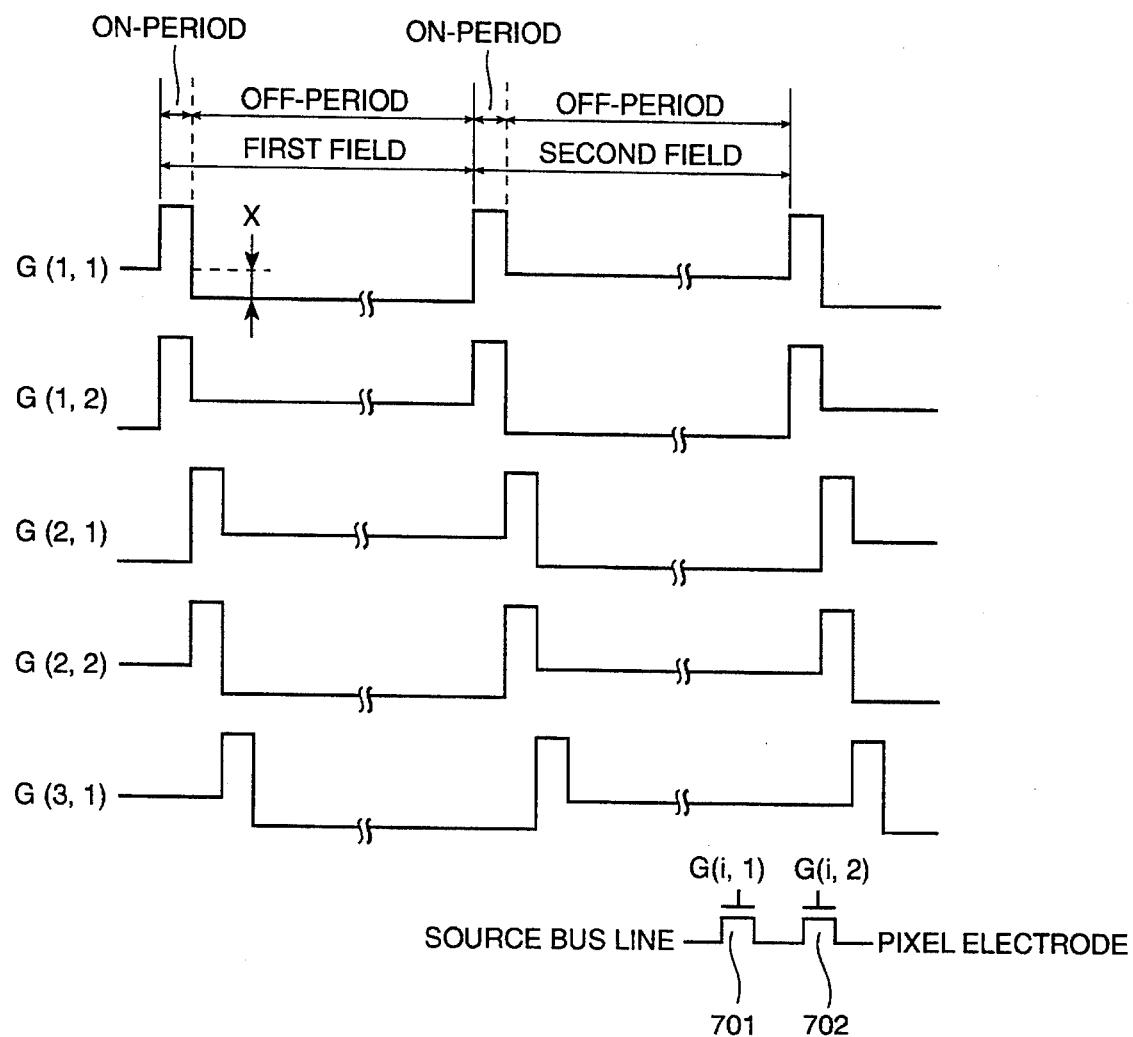
FIG. 7 shows an example of a driving waveform for driving the active matrix substrate of FIG. 1.

FIG. 7 shows exemplary waveforms of the voltage signals applied to the gate bus lines 101a and 101b of the present invention. The notation G(i, j) denotes a gate bus lane to which the voltage signal is applied, where i indicates a pair of gate bus lines corresponding to pixels of i-th row, and j indicates one of the pair of the gate bus lines indicated by i. The gate bus line G(i, 1) is connected to the TFT 701 at the side of the source bus line. The gate bus line G(i, 2) is connected to the TFT 702 at the side of the pixel electrode.

In an actual active matrix type liquid crystal display device, a driving method which includes the step of applying an alternating voltage signal as a video signal to the pixel electrode has been adopted in order to prevent the deterioration of the liquid crystal. In addition, the driving method may include the step of inverting the polarity of The video signal at each row so that anyone does not feel any flicker phenomena.

FIG. 7 shows a method of driving the gate bus lines which is suitable for the driving method mentioned above. It is assumed that the video signal has positive (+) polarity for odd rows of pixels (where i= 1, 3, 5 . . . ), while the video signal has negative (−) polarity for even rows of pixels (where i=2, 4, 6 . . . ) in a first field. It is also assumed that the polarity of the video signal is inverted between the odd rows and the even rows in the next second field. Each field is divided into two periods, an ON-period and an OFF-period. The ON-period means a period when the TFTs 701 and 702 are in the ON-state. The OFF-period means a period when the TFTs 701 and 702 are in the OFF-state.

As seen from FIG. 7, the electric potential of the gate bus line G(1, 1) is set lower than that of the gate bus line G(1, 2) by X V during the OFF-period of the first field, where the notation X has the same meaning mentioned above and has a positive value. On the contrary, the electric potential of the gate bus line G(2, 1) is set higher than that of the gate bus line G(2, 2) by X V during the OFF-period of the first period. This is because a pair of the gate bus lines G(1, j) (j=1, 2) corresponds to an odd row of pixels, while a pair of the gate bus lines G(2, j) (j=1, 2) corresponds to an even row of pixels. During the OFF-period of the second field, the electric potentials of the gate bus lines during the OFF-period of the first field are exchanged with each other. For example, the electric potential of the gate bus line G(1, 1) during the OFF-period of the second field is equal to that of the gate bus line G(1, 2) during the OFF-state of the first field, and the electric potential of the gate bus line G(1, 2) during the OFF-period of the second field is equal to that of the gate bus line G(1, 1) during the OFF-period of the first field.

As mentioned above, each time the polarity of the video signal is inverted by a field, the electric potentials of the gate bus lines G(i, 1) and G(i, 2) during the OFF-period are exchanged with each other. This makes it possible to realize the most appropriate bias condition for reducing the OFF-current regardless of the polarity of the video signal. As a result, the OFF-characteristics of TFTs are improved so as to obtain an excellent display quality.

In the embodiment mentioned above, the two TFTs connected in series to the pixel are used for a switching function. However, the number of the TFTs is not limited to two. A plurality of TFTs connected in series to the pixel can be also used for a switching function for the pixel by preparing a plurality of gate bus lines which are electrically isolated from one another, and by optimizing the electric potentials applied to the gate electrodes of the plurality of TFTs so as to achieve a further improvement of the OFF-characteristics of the TFTs. When a plurality of TFTs connected in series are used, different electric potentials can be applied to gate electrodes of the TFTs so that the electric potentials are monotonously increased toward a higher electric potentials of the electric potentials of the source electrode and the drain electrode of the TFTs, depending on the sequence order of the TFTs. Each of the differences between electric potentials of respective gate electrodes of the TFTs is preferably not greater than a peak-to-peak maximum value of the video signal applied to the liquid crystal.

In the embodiment mentioned above, self-aligned type TFTs are used. The present invention can be applied to an active matrix substrate including a plurality of TFTS which have LDD (Lightly Doped Drain) structure.

As is apparent from the above, in the active matrix substrate of the present invention, the gate electrodes of the plurality of TFTs are electrically isolated from one another. Different electric potentials may be applied to the gate electrodes. This makes it possible to reducing the OFF-current. As a result, the characteristics of the pixel for holding the video signal can be improved, and thus the display quality of the liquid crystal display device can be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate comprising:
   a plurality of pixels arranged in a matrix manner;
   a plurality of switching elements connected in series to each of said plurality of pixels, each of said plurality of switching elements having a gate electrode, a gate electrode of at least one of said plurality of switching elements being electrically isolated from those of the other remaining switching elements; and
   a gate driving means for applying an electric potential to said gate electrodes of said plurality of switching elements while said plurality of switching elements are simultaneously in an OFF-state, the electric potential applied to one of said gate electrodes being different than the electric potential applied to another of said gate electrodes.

2. The active matrix substrate according to claim 1, wherein said switching elements are thin film transistors.

3. A method for driving an active matrix substrate which has a plurality of pixels arranged in a matrix manner, and a plurality of switching elements connected in series to each of said plurality of pixels, each of said plurality of switching elements having a gate electrode, a gate electrode of at least one of said plurality of switching elements being electrically isolated from those of the other remaining switching elements, said method comprising the step of:
   applying electric potentials to the respective gate electrodes of said plurality of switching elements so that said plurality of switching elements are simultaneously in the OFF-state, an electric potential applied to at least one of said gate electrodes being different from electric potentials applied to the other remaining gate electrodes.

4. The method according to claim 3, wherein said electric potentials applied to each of said gate electrodes of switching elements connected to pixels in at least one row of said matrix are increased monotonously according to a polarity of an applied data signal and a geometrical order of said switching elements.

5. The method according to claim 3, wherein the number of said plurality of switching elements connected in series to each of said plurality of pixels is two, said active substrate is used in a display apparatus, said plurality of pixels are driven by alternating voltage signals including successive fields, the method comprising the steps of:
   (1) applying a first electric potential to the gate electrode of a first switching element and applying a second electric potential to the gate electrode of a second switching element so that said switching elements are in the OFF-state in a first field;
   (2) applying said second electric potential to the gate electrode of said first switching element and applying said first electric potential to the gate electrode of said second switching element so that said switching elements are in the OFF-state in the next second field;
   (3) repeating steps (1) and (2) alternately in each field.

6. An active matrix substrate, comprising:

a plurality of pixel electrodes arranged in a matrix;

a plurality of source and gate lines;

first and second switching elements connected in series to each of said pixel electrodes, each of said switching elements having a source electrode, a gate electrode and a drain electrode, said source electrode of said first switching element connected to said source line, said gate electrode of said first switching element connected to a first gate line and said drain electrode of said first switching element connected to said source electrode of said second switching element, said gate electrode of said second switching element connected to a second gate line and said drain electrode of said second switching element connected to said pixel electrode; and gate driving means for applying an electric potential to said first and second gate lines while said first and second switching elements are simultaneously in an OFF-state, the electric potential applied to said first gate line being different than the electric potential applied to said second gate line.

7. The active matrix substrate of claim 6, wherein said gate driving means applies a first electric potential to said first gate line and a second electric potential to said second gate line when said switching elements are in a first OFF-state field, and said gate driving means applies said second electric potential to said first gate line and said first electric potential to said second gate line when said switching elements are in a second OFF-state field.

8. The active matrix substrate of claim 6, wherein said gate driving means applies said different electric potentials to said first gate line and said second gate line while said switching elements are in an OFF-state field, so that source-drain voltages of said first and second switching elements are substantially equal to each other.

* * * * *